United States Patent
Elson et al.

(10) Patent No.: US 6,752,097 B1
(45) Date of Patent: Jun. 22, 2004

(54) UNITARY PLASTIC BOAT LIFT BUOYANCY TANK

(75) Inventors: Todd A. Elson, Claremore, OK (US); David L. Waltrip, Tulsa, OK (US)

(73) Assignee: HydroHoist International, Inc., Claremore, OK (US)

( * ) Notice: Subject to any disclaimer, the term of this patent is extended or adjusted under 35 U.S.C. 154(b) by 0 days.

(21) Appl. No.: 10/319,037

(22) Filed: Dec. 13, 2002

Related U.S. Application Data (63) Continuation-in-part of application No. 09/860,082, filed on May 17, 2001.

(51) Int. Cl.[7] .................................................. B63C 1/02
(52) U.S. Cl. .......................... 114/45; 114/266; 114/267; 114/77 R
(58) Field of Search .................. 114/44–54, 61.1, 114/61.22–61.25, 263–267, 283, 292, 344, 345, 355, 357, 77 R, 77 A, 79 R, 80, 81; 405/218–221, 3–7; 52/578, 579, 716.1

(56) References Cited

U.S. PATENT DOCUMENTS

| | | | | | |
|---|---|---|---|---|---|
| 2,394,764 | A | * | 2/1946 | Greulich | 114/267 |
| 3,073,274 | A | * | 1/1963 | Lamb | 114/266 |
| 3,614,937 | A | * | 10/1971 | Schulman | 114/283 |
| 3,616,774 | A | * | 11/1971 | Thompson | 114/266 |
| 3,673,976 | A | * | 7/1972 | Reynolds | 114/61.22 |
| 3,760,754 | A | * | 9/1973 | Drummond et al. | 114/266 |
| 3,796,175 | A | * | 3/1974 | Ford, Jr. | 114/61.2 |
| 3,968,532 | A | * | 7/1976 | Bailey | 114/352 |
| 4,078,515 | A | * | 3/1978 | Svirklys | 114/266 |
| 4,260,293 | A | * | 4/1981 | Peterson | 405/219 |
| 4,418,634 | A | * | 12/1983 | Gerbus | 114/263 |
| 4,562,786 | A | * | 1/1986 | Pruonto | 114/61.22 |
| 4,892,052 | A | * | 1/1990 | Zook et al. | 114/85 |
| 4,928,617 | A | * | 5/1990 | Meriwether | 114/267 |
| 4,993,350 | A | * | 2/1991 | Pepper | 114/292 |
| 5,509,563 | A | * | 4/1996 | Jolly | 220/221 |
| 5,540,169 | A | * | 7/1996 | Davis et al. | 114/61.1 |
| 5,845,594 | A | * | 12/1998 | Hallsten et al. | 114/263 |

FOREIGN PATENT DOCUMENTS

| | | | | |
|---|---|---|---|---|
| FR | 2629785 A1 | * | 10/1989 | B63B/1/12 |
| FR | 2640225 A1 | * | 6/1990 | B63B/35/34 |
| GB | 2141075 A | * | 12/1984 | B63B/3/00 |
| GB | 2268448 A | * | 1/1994 | B63B/3/02 |
| JP | 06270886 A | * | 9/1994 | B63C/1/02 |

* cited by examiner

*Primary Examiner*—S. Joseph Morano
*Assistant Examiner*—Ajay Vasudeva
(74) *Attorney, Agent, or Firm*—Frank J. Catalano (57) ABSTRACT

A plastic rotationally molded polyethylene buoyancy tank for boat lifts allows connection of steel to lengthwise grooves molded into each side of the buoyancy tank. Preferably, a plastic bulkhead is formed within the tank during its molding process. A segment of framing steel is bracketed between a pair of inwardly tapered compressible opposed grips. The compressible grips each have outwardly tapered slots with mating tapered rigid inserts. With the inserts partially seated on the grips, the grips are slipped lengthwise or pressed laterally into their respective grooves. Bolts extending through the grips into threaded holes in the inserts are tightened to pull the grips over their tapered inserts. This spreads and compresses the grips in their respective grooves, locking the brackets and connecting steel in place on top of the tanks.

12 Claims, 7 Drawing Sheets

UNITARY PLASTIC BOAT LIFT BUOYANCY TANK

This application is a continuation-in-part of U.S. patent application Ser. No. 09/860,082, filed May 17, 2001, for "Unitary Plastic Boat Lift Buoyancy Tank."

BACKGROUND OF THE INVENTION

This invention relates generally to lifts for watercraft and more particularly concerns buoyancy tanks for boat lifts and the like.

Corrosion is a major concern in the manufacture and maintenance of boat lifts. Typically, boat lift buoyancy tanks are encompassed by steel which secures the tanks and permits connection of other components to the lift. In use, at least parts of the steel are always submerged and constantly exposed to a corrosive environment which leads to shortened lift life. One method used by the industry to deal with this problem is the use of steel inserts, such as specially threaded nuts, which are molded into plastic parts. Since the steel must be fixed to the lift in the specific locations and orientations dictated by the inserts, design flexibility is limited. Furthermore, these inserts are normally longitudinally spaced on the buoyancy tanks and molded in place perpendicular to the shrinkage plane. In the cooling phase of the molding process, as the plastic shrinks over the length of the tank, the inserts can't move with the shrinkage. This results in tank deformation and other problems.

Bulkheads are another factor impacting the manufacture and quality of boat lift buoyancy tanks. Bulkheads are currently used in some existing buoyancy tanks as a divider or baffle to control air and water. Because buoyancy tanks are made by rotational molding, the molded tank is a finished product. Access to the inside of the tank to install a bulkhead is impossible without violating the integrity of the tank. As a result, in known manufacturing processes, bulkhead installation is a time consuming and tedious process.

It is, therefore, an object of this invention to provide a boat lift buoyancy tank which supports all non-plastic connections above the water line when the lift is raised. Another object of this invention is to provide a boat lift buoyancy tank which permits universal selection of connection points for the lift components along the length of the tank. A further object of this invention is to provide a boat lift buoyancy tank which eliminates the need for multiple single position inserts to accommodate connection of the lift components. Yet another object of this invention is to provide a boat lift buoyancy tank which has contours adapted for connection of lift components which will not deform as a result of shrinkage during the molding process. It is also an object of this invention to provide a boat lift buoyancy tank which has an integral internal bulkhead formed during the tank molding process. Still another object of this invention is to provide a boat lift buoyancy tank which eliminates the need for installing bulkheads after the tank is molded.

SUMMARY OF THE INVENTION

In accordance with the invention, a plastic rotationally molded polyethylene buoyancy tank for boat lifts allows connection of steel to lengthwise grooves molded into each side of the buoyancy tank. The grooves are located proximate the top of the buoyancy tank so that the steel anchored to the grooves is fully above the water line when the lift is in its raised position. Therefore, the steel is not constantly exposed to the corrosive environment of the water. The lengthwise grooves allow the steel to be attached anywhere along the length of the tank, affording a high degree of flexibility in the design of the boat lift structure.

In one embodiment, a segment of framing steel is bracketed between a pair of inwardly tapered compressible opposed grips. The compressible grips each have outwardly tapered slots with mating tapered rigid inserts. With the inserts partially seated on the grips, the grips are slipped lengthwise or pressed laterally into their respective grooves. Bolts extending through the grips into threaded holes in the inserts are tightened to pull the grips over their tapered inserts. This spreads and compresses the grips in their respective grooves, locking the brackets and connecting steel in place on top of the tanks.

In another embodiment, the framing steel segment or elongated spacer has first and second brackets fixed to each of its ends. First and second elongated members of transverse cross-section are contoured to be seated in each of the lengthwise grooves of the tank. Third and fourth brackets are fixed to each of the first and second elongated members. First and second mechanisms pull the third and fourth brackets toward their respective first and second brackets with the elongated members disposed in their respective grooves so as to lock the spacer in place above the tank. In a satisfactory prototype, the elongated members are tubular, the first and second brackets are angle irons and the third and fourth brackets are channel members. The angle irons and channel members are aligned with their flanges disposed in parallel planes and the webs of the angle irons slide on the webs of their respective channels as the angle irons are pulled toward the channels. The flanges of mated ones of the angle irons and channel members have at least one set of aligned apertures therethrough and the pulling mechanism consists of a plurality of nuts and bolts with one bolt extending through each set of apertures. Fifth and sixth brackets can be fixed between the third and fourth brackets and their respective elongated members to space the third and fourth brackets above their respective elongated members, if necessary. Multiple spacers and associated components can be used on each of the elongated members.

Preferably, a plastic bulkhead is formed within the tank during its molding process. The bulkhead is made from a plastic that has a slightly higher melting point than the tank's plastic. The plastic bulkhead is held in place in the mold during the tank molding process. The temperature in the process melts the powdered plastic for the tank and almost melts the plastic bulkhead. The two plastics fuse together around the perimeter of the inner mold surface, resulting in a molded-in-place bulkhead.

BRIEF DESCRIPTION OF THE DRAWINGS

Other objects and advantages of the invention will become apparent upon reading the following detailed description and upon reference to the drawings in which.

While the invention will be described in connection with preferred embodiments and methods, it will be understood that it is not intended to limit the invention to those embodiments or methods. On the contrary, it is intended to cover all alternatives, modifications and equivalents as may be included within the spirit and scope of the invention as defined by the appended claims.

DETAILED DESCRIPTION

Figures 1, 12:
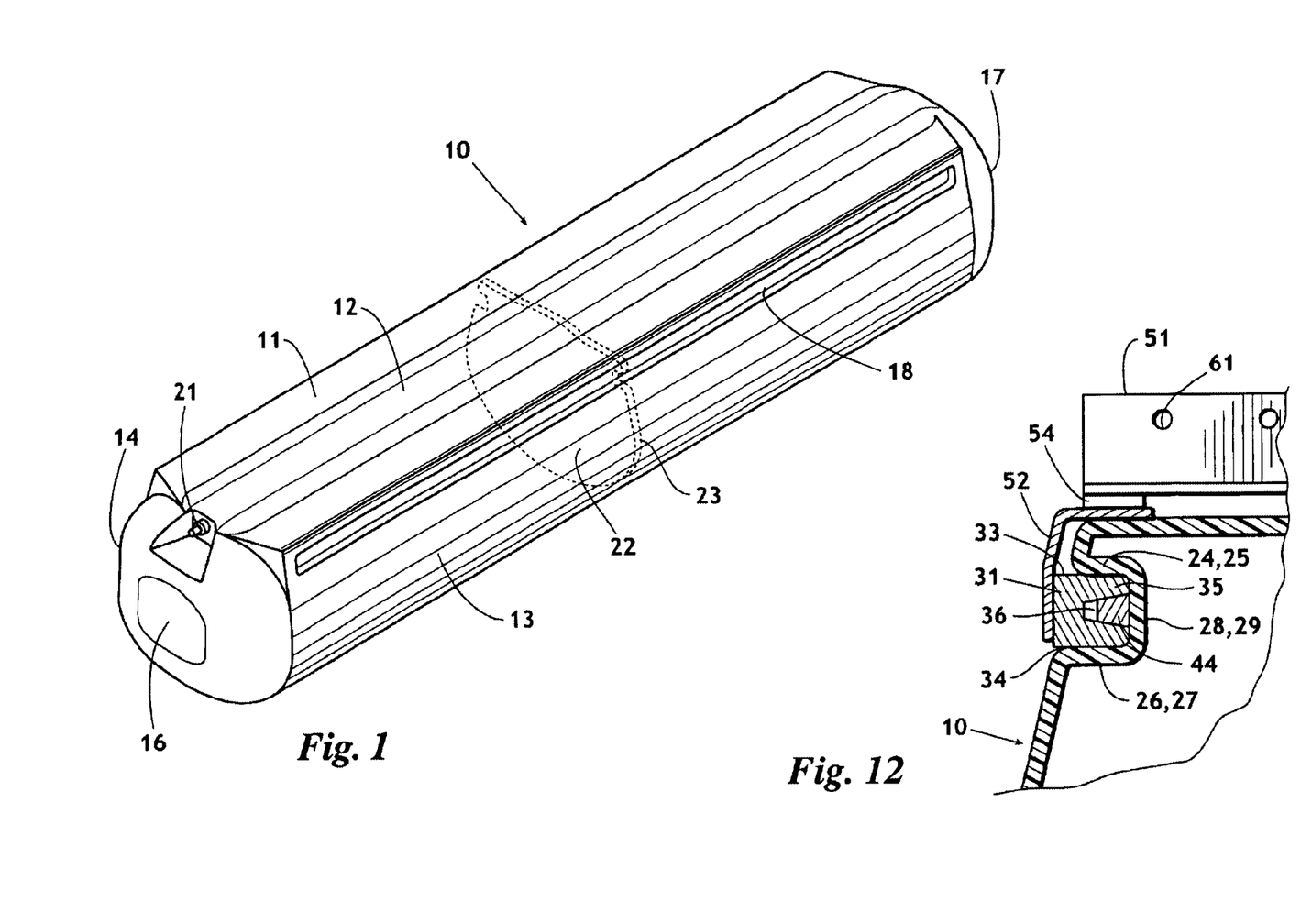
FIG. 1 is a perspective view of a preferred embodiment of the molded plastic buoyancy tank with a plastic bulkhead molded in place.
FIG. 12 is an exploded sectional view illustrating the bracket assembly of FIG. 8 mounted on the buoyancy tank.
Figure 2:
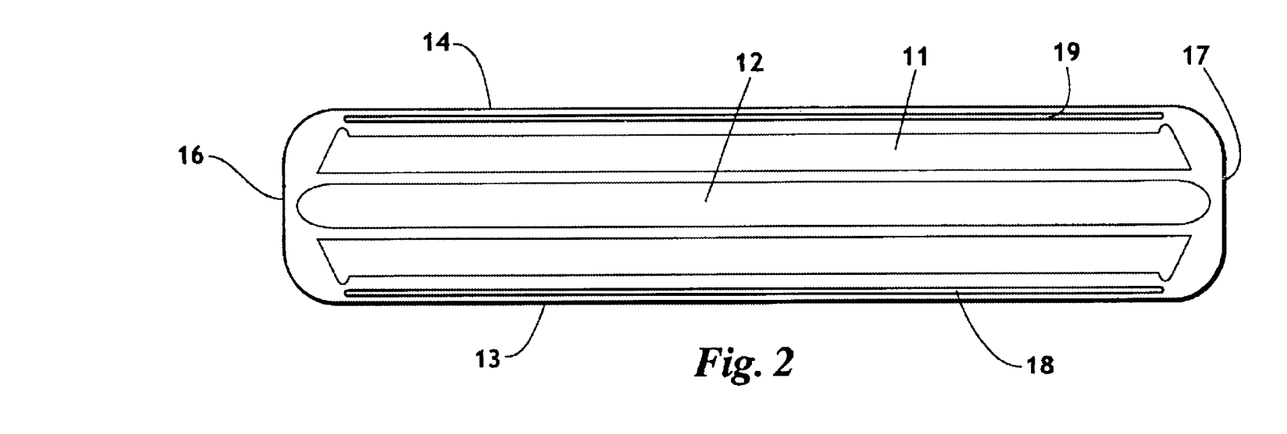
FIG. 2 is a top plan view of the buoyancy tank of FIG. 1.
Figure 3:
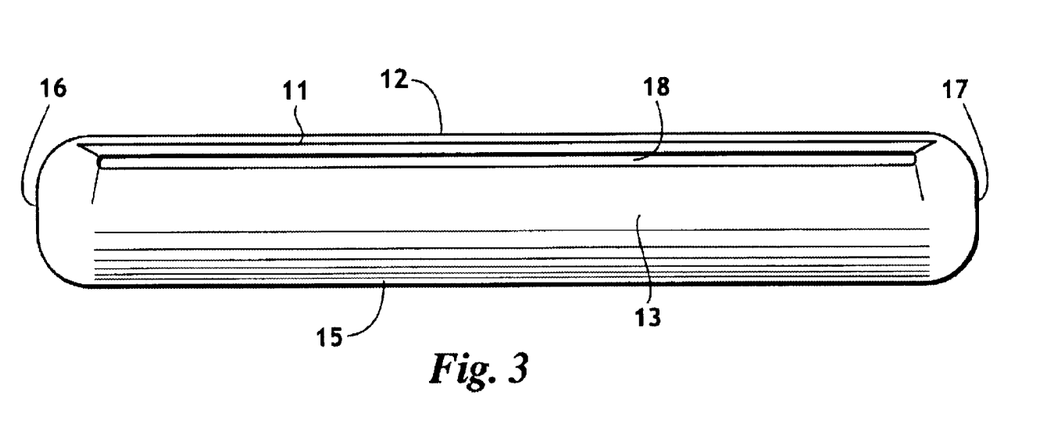
FIG. 3 is a side elevation view of the buoyancy tank of FIG. 1.

Turning first to FIGS. 1–4, a preferred embodiment of the rotationally molded polyethylene buoyancy tank is illustrated. The tank 10 is an elongated shell having a substantially flat top wall 11 with a raised portion 12. The flat outer portions of the top wall 11 are desirable for abutment with brackets as will be hereinafter explained. The raised portion 12 of the tank 10 affords an irregular cross-section for the top wall 11, thus affording additional strength to the tank 10. The tank 10 also has side walls 13 and 14 and an arcuate bottom wall 15. The shell is completed by end walls 16 and 17. Each side wall 13 and 14 is provided with a lengthwise groove 18 and 19, respectively, extending substantially for the entire length of the sidewalls 13 and 14 and proximate the top wall 11. The tank 10 is also provided with one or more air inlet/outlet passages 21 and water inlet/outlet passages (not shown). As shown in FIG. 1, one or more bulkheads 22 may be provided within the tank 10 for the purpose of controlling the flow of air and water in the tank 10.

Preferably, the tank is molded of polyethylene or other suitable plastic by a rotational molding process. In the molding process, the bulkhead 22 is secured in the tank mold at the beginning of the process. The plastic powder for the tank 10 has a melting temperature which is lower than the process temperature at which the tank 10 is molded. The bulkhead 22, on the other hand, is preformed from plastic having a melting temperature slightly higher than the process temperature. Therefore, as the tank 10 is molded at the process temperature, the tank 10 and the bulkhead 22 are fused together along the perimeter 23 of the bulkhead 22. As shown, the bulkhead 22 is transverse to the length of the tank 10 and disposed approximately at its midpoint. However one or more bulkheads can be used in any position or orientation.

Figure 4:
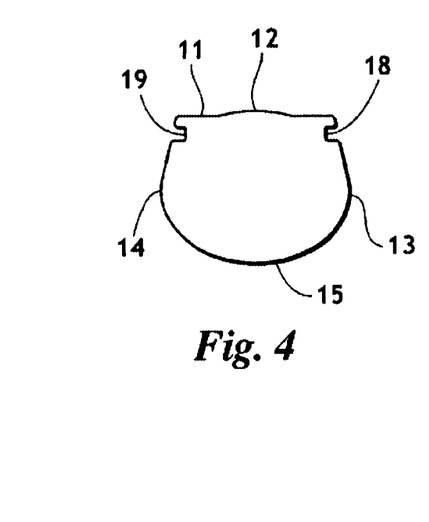
FIG. 4 is an end elevation view of the buoyancy tank of FIG. 1.
Figures 5, 6:
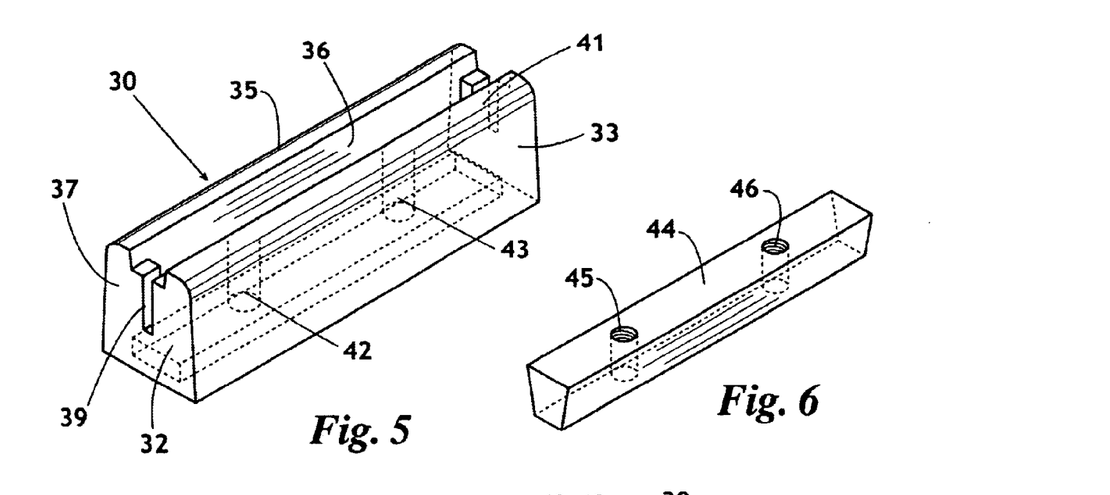
FIG. 5 is a perspective view of a preferred embodiment of the grips used to secure float framing components to the buoyancy tank.
FIG. 6 is a perspective view of a preferred embodiment of the inserts used with the grips of FIG. 5.

Looking at FIGS. 1, 4 and 12, the configuration of the grooves 18 and 19 is best seen. The grooves 18 and 19 have top 24 and 25 and bottom 26 and 27 walls, respectively. The grooves 18 and 19 are opposed to each other so that the top 24 and 25 and bottom 26 and 27 walls extend inwardly into the tank 10 to side walls 28 and 29, respectively. Preferably, as shown, the groove top 24 and 25 and bottom 26 and 27 walls are narrowingly tapered or converging toward the groove side walls 28 and 29, respectively. A taper angle of approximately two degrees relative to horizontal is suitable.

Looking now at FIGS. 5, 7, 8 and 12, a grip 30 for use with the grooves 18 and 19 is illustrated. The grip 30 is a resiliently compressible member having a back wall 31 with a rigid plate 32 inset in the back wall 31 along the length of the grip 30. The side walls 33 and 34 of the grip 30 are inwardly narrowingly tapered from the back wall 31 to the front wall 35 so that, in exterior cross section, the grip 30 is substantially trapezoidal. A recess 36 is provided in the grip 30 through the front wall 35. The recess 36 is wideningly or outwardly tapered toward the back wall 31. The recess taper angle of two to three degrees relative to horizontal is suitable. The end walls 37 and 38 have slots 39 and 41 extending from the front wall 35 toward the back wall 31 to permit the front wall 35 and back wall 31 to be more manipulable relative to each other. One or more smooth holes 42 and 43 extend through the plate 32 and the back wall 31 into the recess 36.

Looking at FIGS. 6, 7, 8 and 12, a rigid insert 44 having a trapezoidal cross-section is tapered for insertion into the recess 36 in the grip 30. Preferably, the taper of the cross-section of the insert 44 is at a steeper angle than the taper of the recess 36. This can best be seen in FIG. 7. The insert 44 is provided with one or more threaded holes 45 and 46 which align with the smooth holes 42 and 43 in the grip 30 when the insert 44 is inserted into the recess 36 in the grip 30. Bolts 47 and 48 extending through the holes 42 and 43 in the grip 30 and threadedly engaged in the holes 45 and 46 in the insert pull the rigid insert 44 into the recess 36 as they are rotated. Preferably, the plate 32 and the insert 44 are made of aluminum and the grip 30 is made of molded polyurethane.

Figures 7, 8:
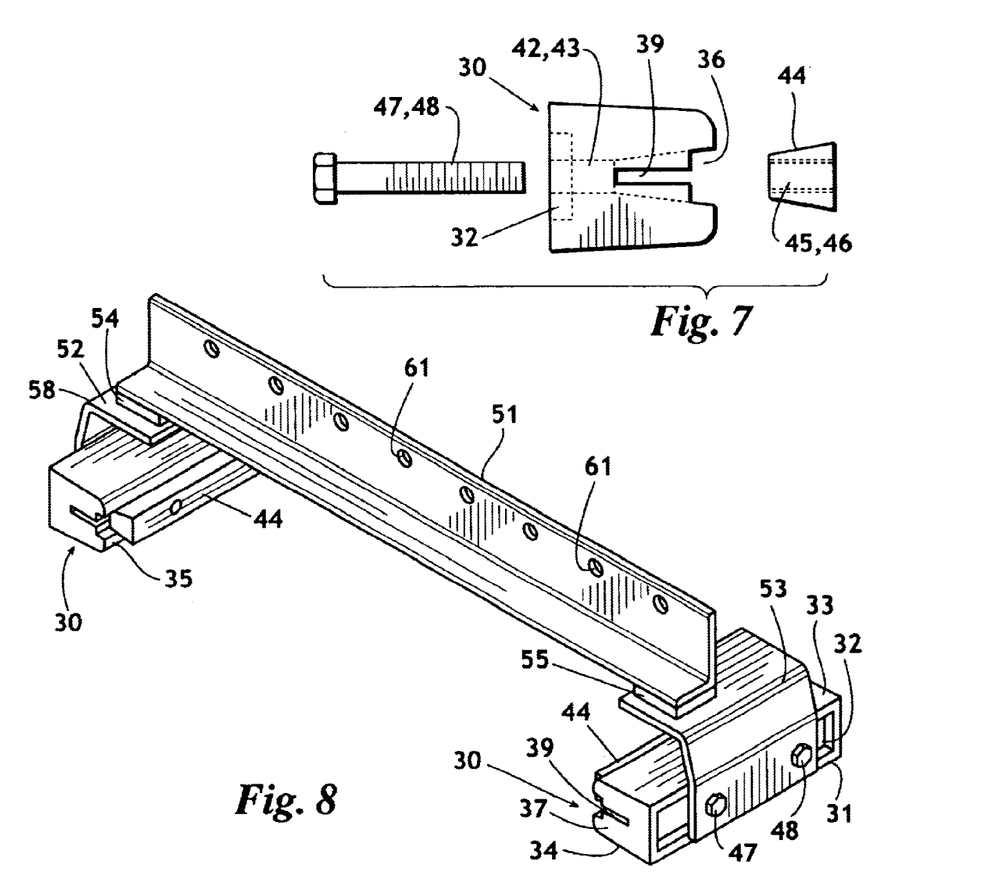
FIG. 7 is an end elevation assembly view of the grips and inserts of FIGS. 5 and 6.
FIG. 8 is a perspective view of a preferred embodiment of a bracket assembly for use with the grips and inserts of FIGS. 5 and 6.

Looking now at FIG. 8, the use of the grips 30 to secure a segment of the framing steel 51 of the boat lift to the tank 10 is illustrated. As shown, a section of framing steel 51 such as an angle iron is sufficiently long to extend substantially across the top wall 11 of the tank 10. A 3"×2"×3/16" steel angle iron is suitable. The ends of the framing steel 51 are connected to brackets 52 and 53, possibly formed from 1/4" steel. As shown, spacers 54 and 55 are welded between the brackets 52 and 53 and the framing steel 51 if necessary to permit the framing steel 51 to ride over the raised portion 12 of the tank 10 when the horizontal portions 56 and 57 of the brackets 52 and 53 are seated on the flat top wall 11 of the tank 10. The brackets 52 and 53 extend downwardly to grip mounting portions 58 and 59. The grip mounting portions 58 and 59 have holes (not shown) for the bolts 47 and 48 to extend through the brackets 52 and 53 into the rigid plates 32 in the grip 30.

Figure 9:
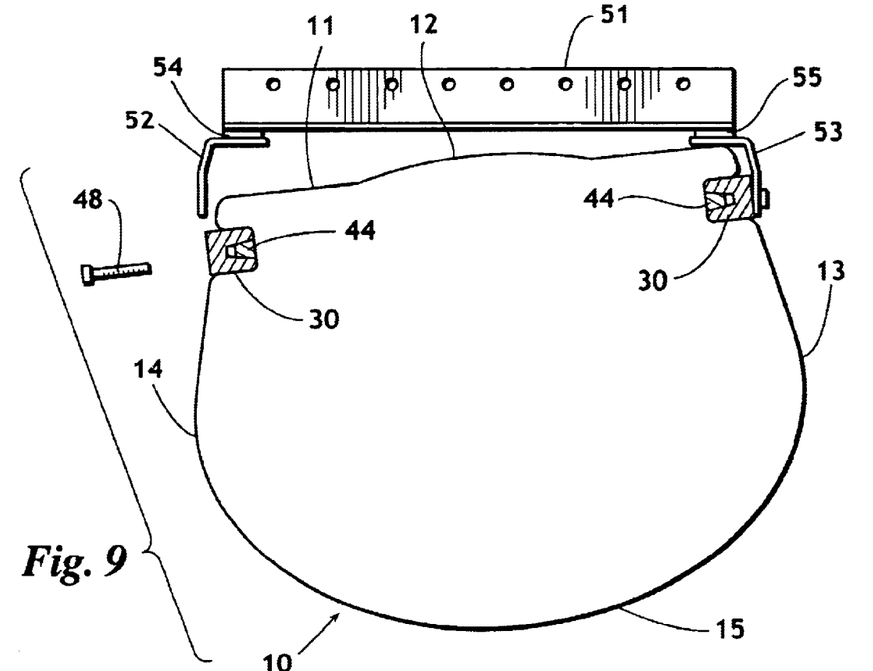
FIG. 9 is a cross-sectional view taken in a plane transverse to the length of the tank at one stage of float assembly.
Figure 10:
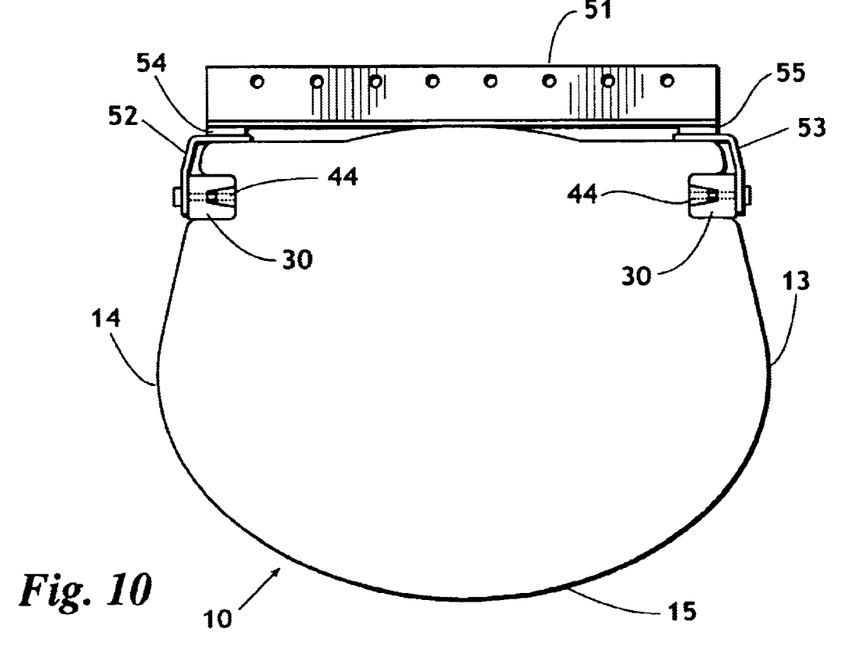
FIG. 10 is a cross-sectional view in a plane transverse to the length of the tank at a subsequent stage of float assembly.

Looking now at FIGS. 9, 10 and 12, the manner of mounting the segment of framing steel 51 to the tank 10 will be explained. Inserts 44 are inserted into the recesses 36 in grips 30 so as to hold these components together without significantly deforming the grips 30. One grip 30 with its insert 44 is then inserted into each groove 18 and 19 in the tank 10 with the inserts 44 against the side walls 28 and 29 of the grooves 18 and 19. The grips 30 are aligned lengthwise in the grooves 18 and 19 at the position at which it is desired to secure the segment of framing steel 51 to the tank 10. The brackets 52 and 53 welded to the framing steel 51 are aligned with the grips 30 seated in the grooves 18 and 19. As shown in FIG. 9, the holes in one of the brackets 53 are aligned with the holes 42 and 43 in its grip 30. The bolts 47 and 48 are inserted through the bracket 53, the rigid plate 32 and the back wall 31 of the grip 30 into the threaded holes 45 and 46 in the insert 44. The bolts are then tightened to pull the insert 44 deeper into the recess 36 until the front wall 35 of the grip 30 is brought into contact with the side wall 29 of the groove 19. The insert 44 compresses the side walls 33 and 34 of the grip 30 against the top and bottom walls 25 and 27 of the groove 19 to lock the grip 30 in the groove 19. As seen in FIG. 10, the holes in the other bracket 52 are then aligned with the holes 42 and 43 in the other grip 30 and the process repeated to secure the other grip 30 in place in its groove 18. With the grips 30 so secured, the segment of framing steel 51 is secured in position atop the top wall 11 of the tank 10. As shown, the segment of framing steel 51 is provided with a plurality of holes 61 to facilitate connection of additional framing steel to the tank 10.

Figure 11:
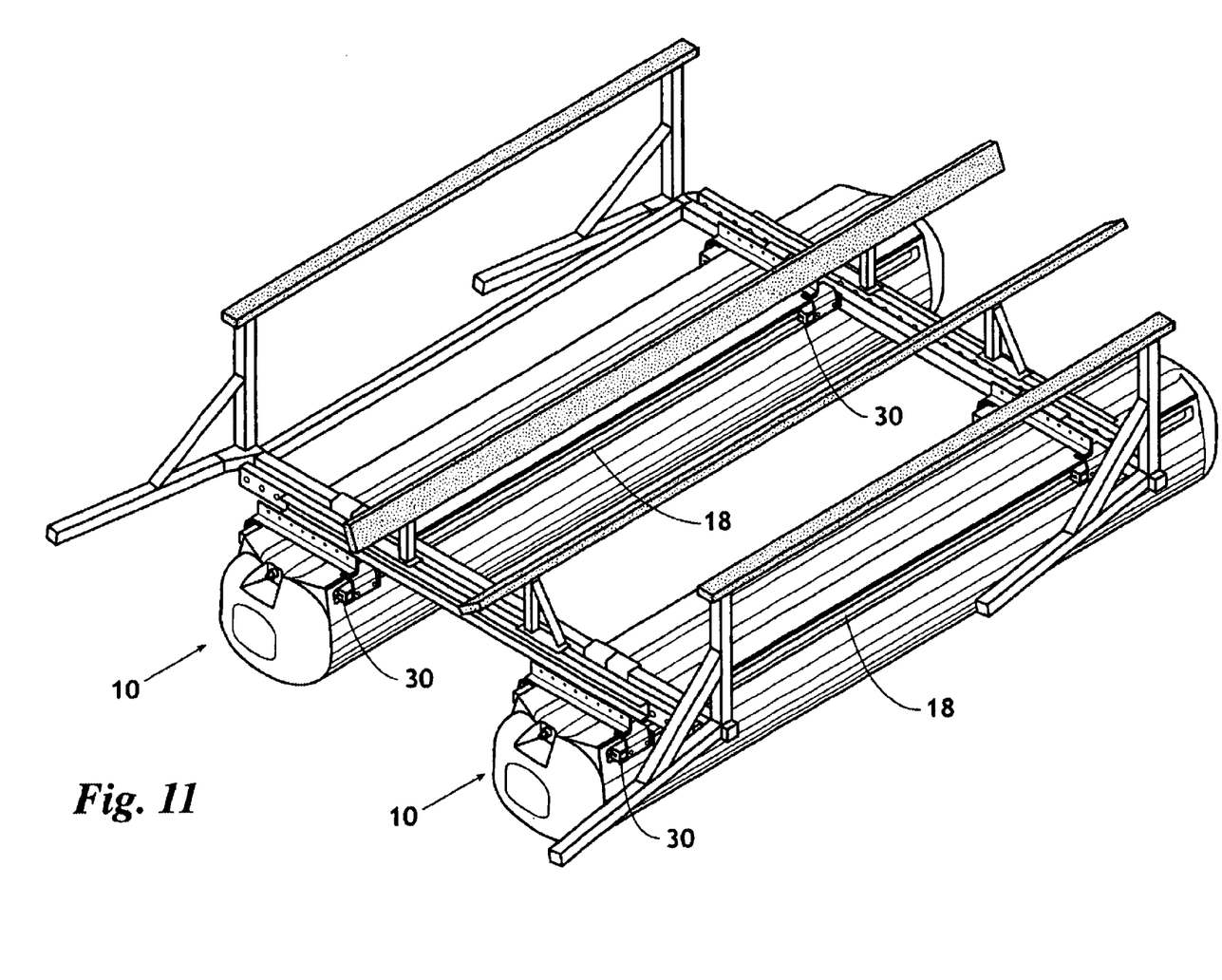
FIG. 11 is a perspective view of a float using the tanks, grips and inserts of the present invention.

Turning to FIG. 11, a boat lift is illustrated in which two tanks 10 in parallel alignment have framing steel secured thereto by use of the parallel grooves 18 and 19 in the upper side walls 13 and 14 of the tanks 10. All of the steel is fixed at or above the level of the grips 30 so that all of the steel will be above the water line when the boat lift is in a raised condition. Since the grooves 18 and 19 extend for substantially the entire length of the tanks 10, the grips 30 and therefore the framing steel 51 can be positioned at any desirable location along the length of the tanks 10. This affords a great deal of flexibility in the design of the lift so that the lift structure can be easily contoured to suit any configuration of water vehicle using the same tanks 10.

Figure 13:
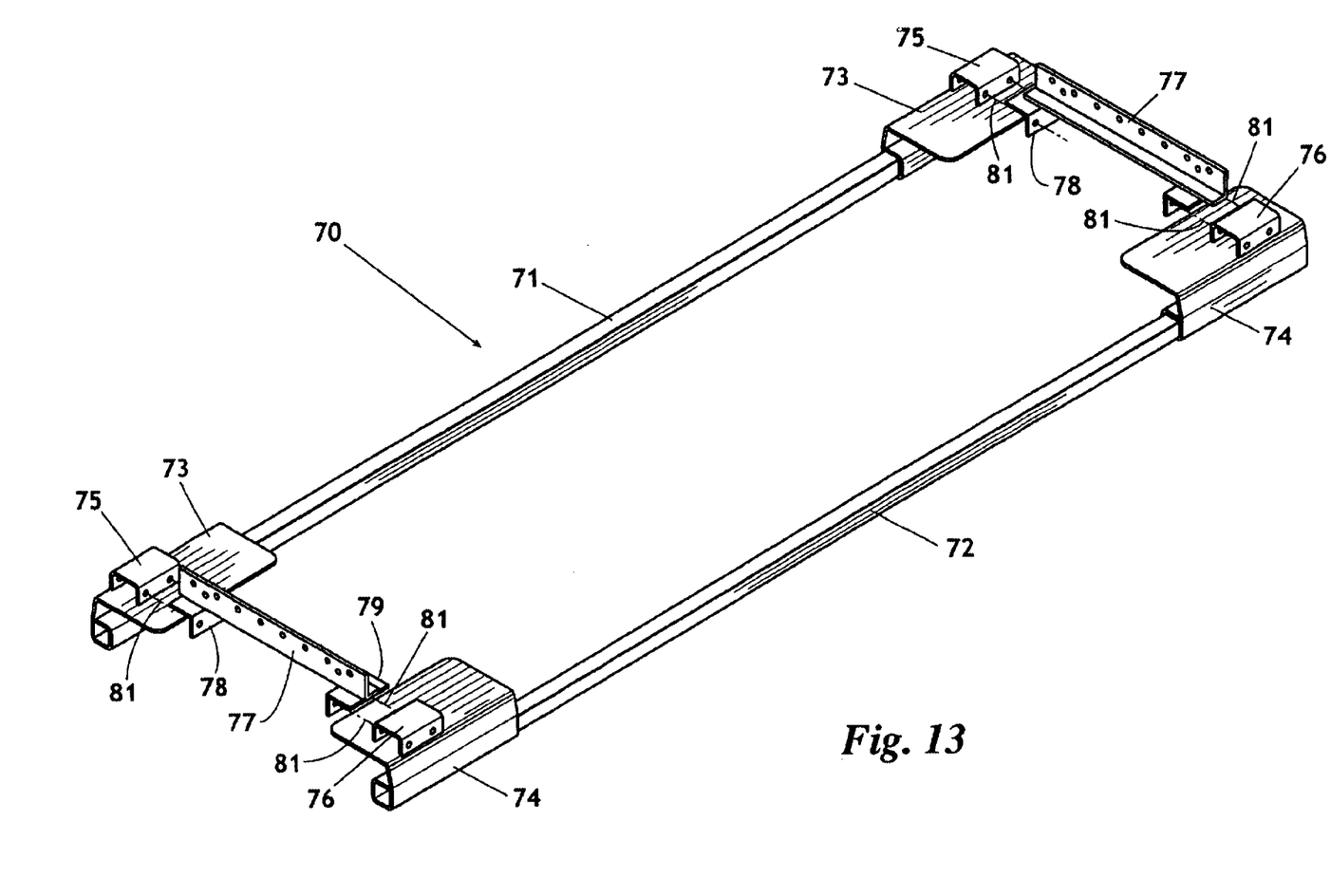
FIG. 13 is a perspective view of another embodiment of the assembly for securing float framing components to the buoyancy tank.
Figure 14:
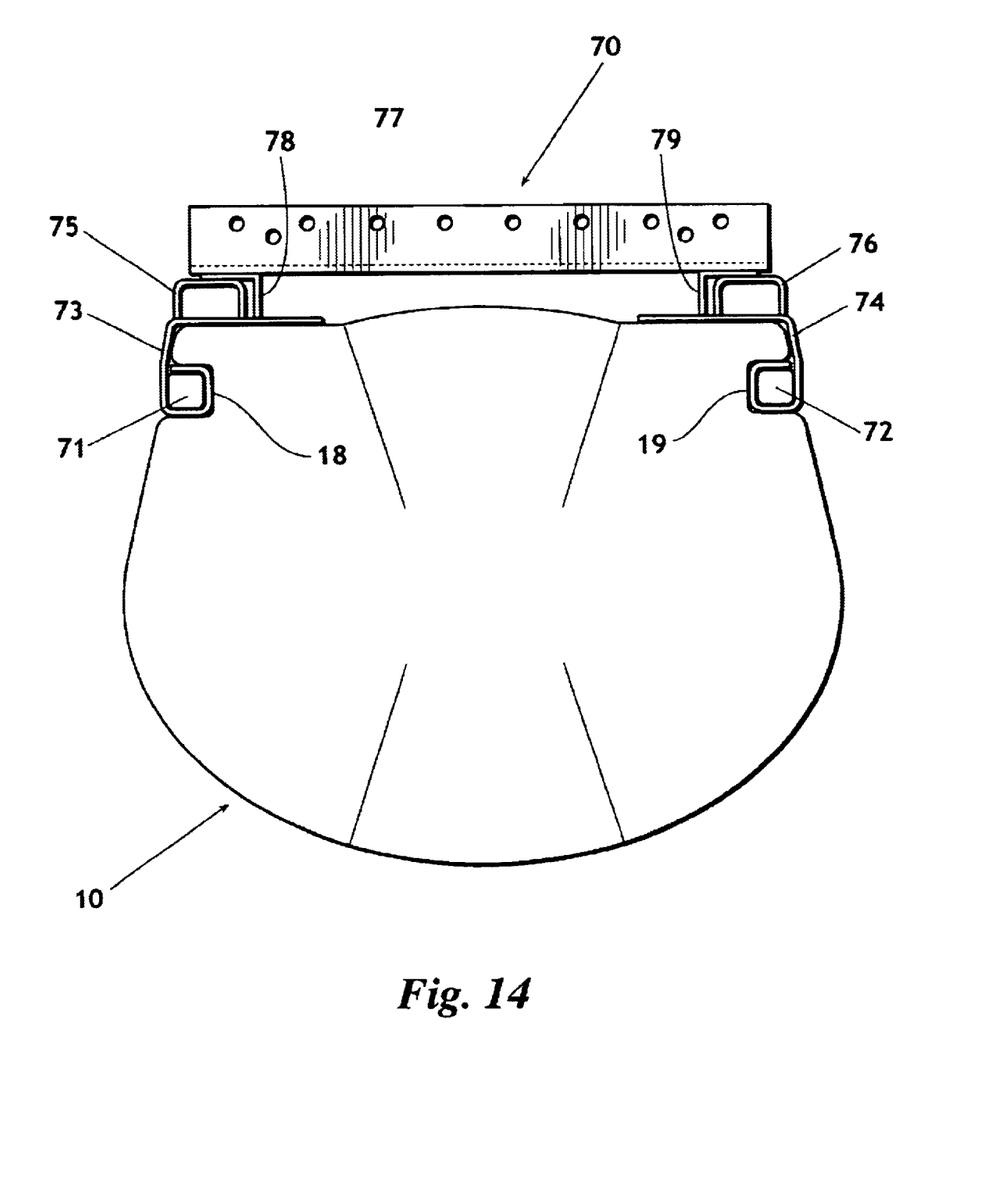
FIG. 14 is an end elevation view of the assembly of FIG. 13 mounted on the tank of FIG. 1.

An alternate embodiment of the assembly 70 for attaching boat lift components to the buoyancy tank 10 is illustrated in FIGS. 13 and 14. A pair of elongated members 71 and 72, preferably tubular, have a transverse cross-section suitable to be fitted, preferably snugly, into the grooves 18 and 19 of the tank 10. As best seen in FIG. 13, the ends of each of the members 71 and 72 are provided with brackets 73 and 74. As shown, each bracket 73 and 74 is a section of angle iron having its flange welded to the outer sidewall of its respective member 71 and 72 and having its horizontal web extending inwardly in relation to the tank 10. Additional brackets 75 and 76, as shown sections of channel, are welded atop the webs of the angle iron brackets 73 and 74 with their flanges parallel to the flanges of the angle iron brackets 73 and 74 and with their webs spaced above the webs of the angle iron brackets 73 and 74. Spacers 77, as shown also being angle irons, have brackets 78 and 79 welded at their ends with the flanges of the spacer brackets 78 and 79 being parallel to the flanges of their respective elongated member channel brackets 75 and 76. As shown, the spacer brackets 78 and 79 are also angle irons. The spacer brackets 78 and 79 are oriented so that their webs will ride atop the webs of the elongated member channel brackets 75 and 76. The flanges of the elongated member channel brackets 75 and 76 and the spacer brackets 78 and 79 have aligned sets of apertures therethrough so that nut and bolt combinations 81 extending through the sets of apertures can be tightened to pull the elongated member channel brackets 75 and 76 toward their respective spacer brackets 78 and 79. Thus, as best seen in FIG. 14, the elongated members 71 and 72 are pulled snugly into their respective grooves 18 and 19 to lock the assembly 70 in place across the top of the tank 10. The elongated members 71 and 72 can extend for the entire length of the grooves 18 and 19 or several sections of such members may be spaced apart along the length of the grooves 18 and 19 with opposed sections being interlocked using single spacers 77. Thus, the lengths and positions of the members 71 or sections of members 71 can be selected to distribute the forces on the assembly 70 according to the needs of the user.

Thus, it is apparent that there has been provided, in accordance with the invention, a boat lift buoyancy tank and a method for making the tank that fully satisfy the objects, aims and advantages set forth above. While the invention has been described in conjunction with specific embodiments and methods, it is evident that many alternatives, modifications and variations will be apparent to those skilled in the art and in light of the foregoing description. Accordingly, it is intended to embrace all such alternatives, modifications and variations as fall within the spirit of the appended claims.

What is claimed is:

1. An assembly for attaching boat lift components to a buoyancy tank having a pair of opposed lengthwise grooves in upper portions of sidewalls thereof comprising an elongated spacer, first and second brackets, one fixed to each end of said spacer, first and second elongated members of transverse cross-section contoured to be seated in each of the lengthwise grooves of the tank, third and fourth brackets, one fixed to each of said first and second elongated members and first and second means for pulling said third and fourth brackets toward said first and second brackets, respectively, with said elongated members disposed in their respective grooves.

2. An assembly according to claim 1, said elongated members being tubular.

3. An assembly according to claim 1, said first and second brackets being angle irons and said third and fourth brackets being channel members.

4. An assembly according to claim 3, said angle irons and said channel members being aligned with flanges thereof disposed in parallel planes and webs of said angle irons sliding on webs of their respective channels as said angle irons are pulled toward said channels.

5. An assembly according to claim 4, said flanges of mated ones of said angle irons and said channel members having at least one set of aligned apertures therethrough and said pulling means comprising a plurality of nuts and bolts, one bolt extending through each said set of apertures.

6. An assembly according to claim 1 further comprising fifth and sixth brackets fixed between said third and fourth brackets and their respective elongated members and spacing said third and fourth brackets above their respective elongated members.

7. An assembly for attaching boat lift components to a buoyancy tank having a pair of opposed lengthwise grooves in upper portions of sidewalls thereof comprising a pair of elongated spacers, each said spacer having first and second brackets, one fixed to each end of said spacer, first and second elongated members of transverse cross-section contoured to be seated in each of the lengthwise grooves of the tank, each said elongated member having third and fourth brackets, one fixed to each of said first and second elongated members proximate each end thereof and a plurality of means, one for pulling each of said third and fourth brackets toward its respective first and second brackets with said elongated members disposed in their respective grooves.

8. An assembly according to claim 7, said elongated members being tubular.

9. An assembly according to claim 7, said first and second brackets being angle irons and said third and fourth brackets being channel members.

10. An assembly according to claim 9, said angle irons and said channel members being aligned with flanges thereof disposed in parallel planes and webs of said angle irons sliding on webs of their respective channels as said angle irons are pulled toward said channels.

11. An assembly according to claim 10, said flanges of mated ones of said angle irons and said channel members having at least one set of aligned apertures therethrough and said pulling means comprising a plurality of nuts and bolts, one bolt extending through each said set of apertures.

12. An assembly according to claim 7 further comprising fifth and sixth brackets fixed between said third and fourth brackets and their respective elongated members and spacing said third and fourth brackets above their respective elongated members.

* * * * *